Aug. 20, 1929.     A. O. MOE     1,725,665
FRUIT AND VEGETABLE SIZING AND GRADING MACHINE
Filed May 3, 1928     4 Sheets-Sheet 3
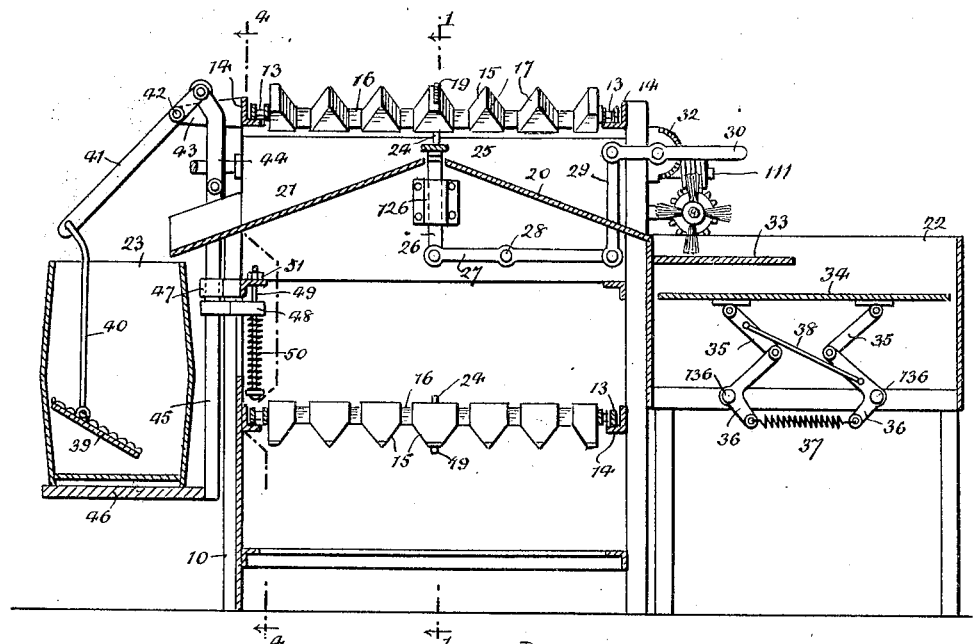
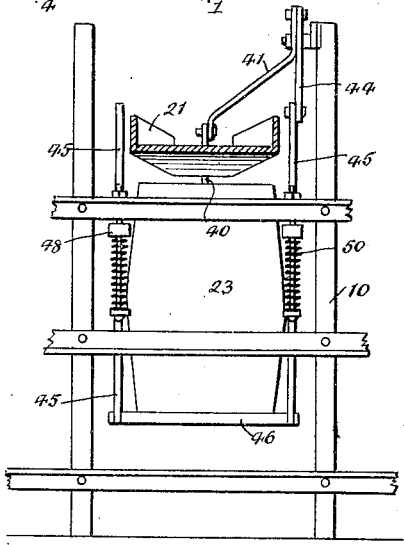
WITNESSES
INVENTOR
Andrew O. Moe
BY
ATTORNEY

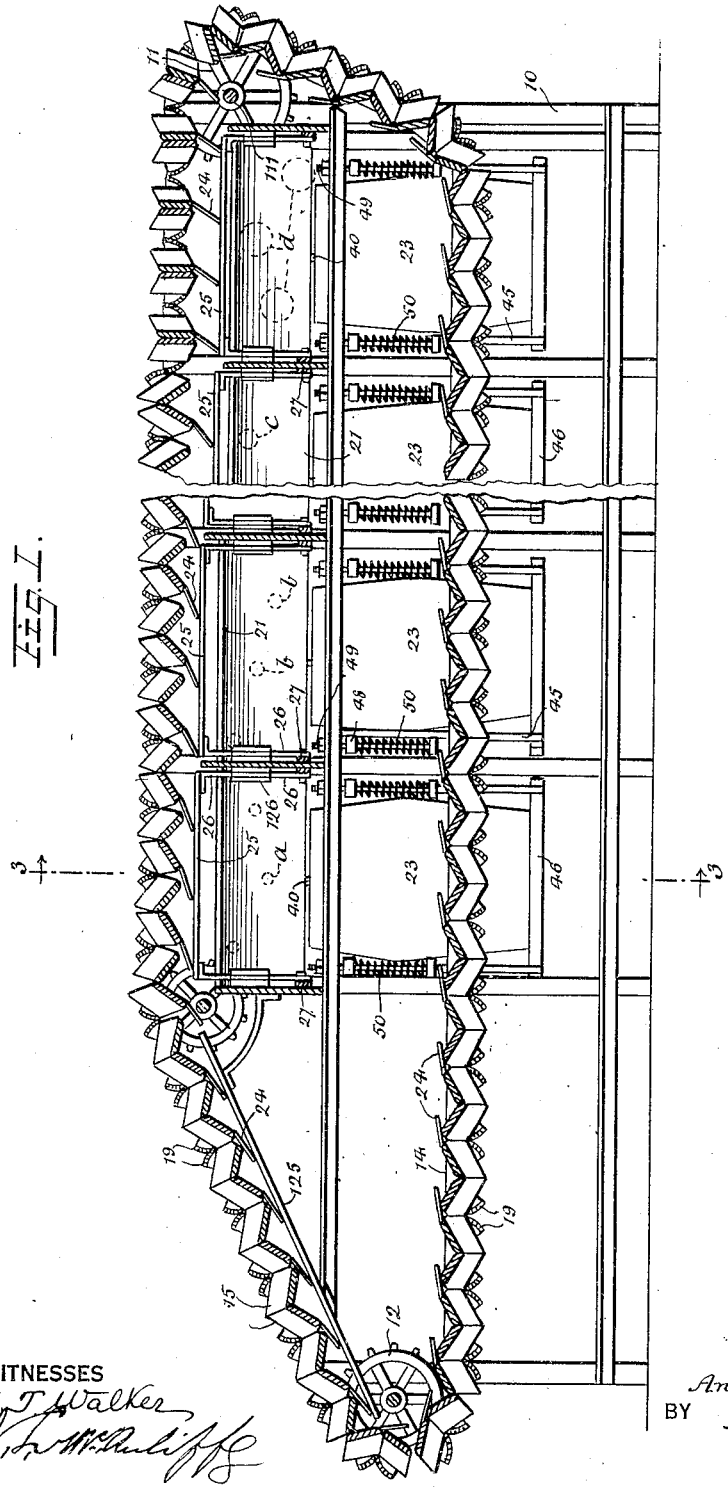

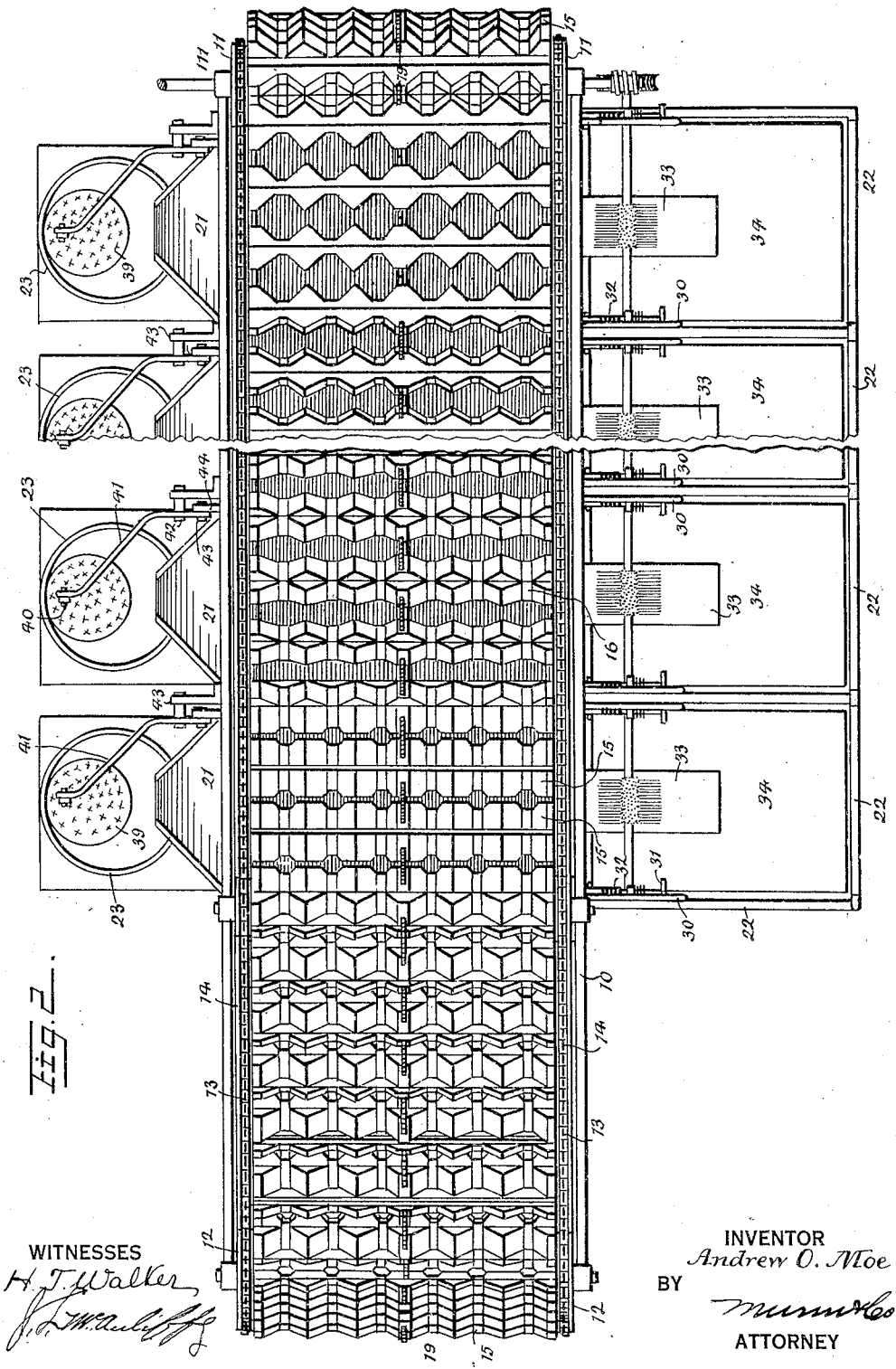

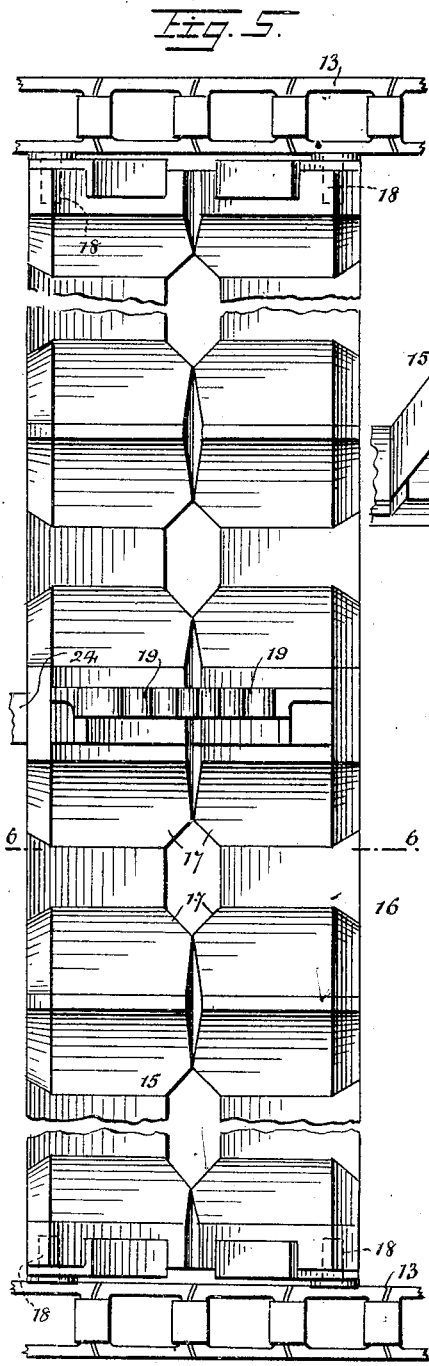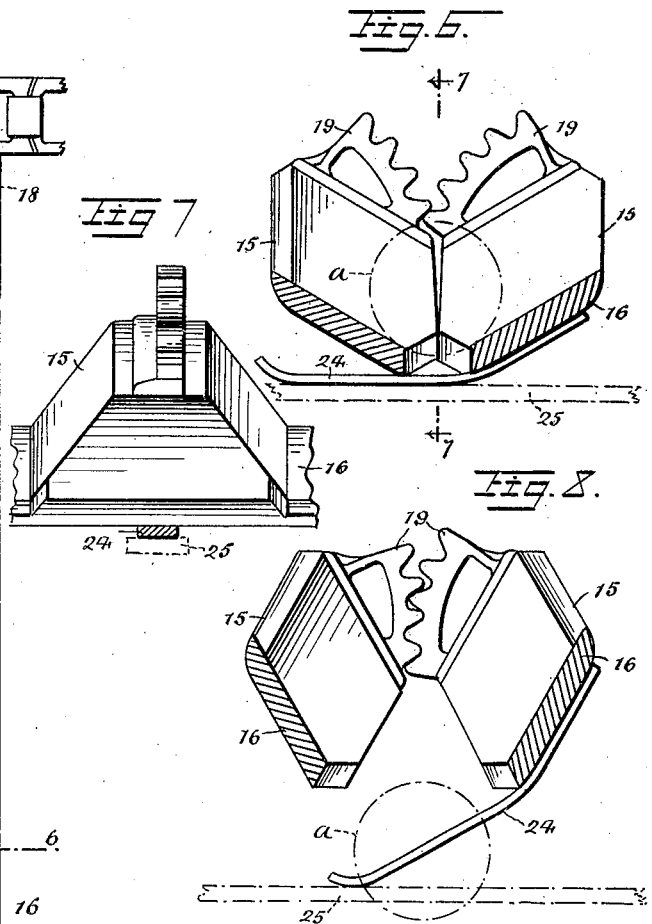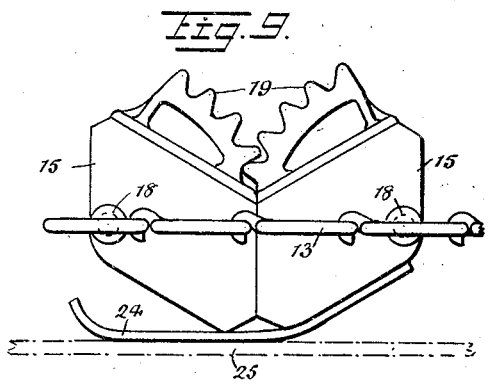

Patented Aug. 20, 1929.

1,725,665

UNITED STATES PATENT OFFICE.

ANDREW O. MOE, OF TOPPENISH, WASHINGTON.

FRUIT AND VEGETABLE SIZING AND GRADING MACHINE.

Application filed May 3, 1928. Serial No. 274,904.

My invention relates to a machine for sizing and grading fruits and vegetables, and particularly to a machine for the indicated purpose having an endless carrier for the articles to be graded and sized.

The general object of my invention is to provide means whereby the belt is adapted to receive the individual fruits or vegetables in separate holders, and means for causing the holders to release the various sizes of fruits in succession and direct the same to separate receivers for the graded articles.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a central vertical longitudinal section of a machine embodying my invention as indicated by the line 1—1 in Figure 3;

Figure 2 is a plan view of my improved machine;

Figure 3 is a transverse vertical section as indicated by the line 3—3 in Figure 1;

Figure 4 is a fragmentary detail in longitudinal section as indicated by the line 4—4 in Figure 3;

Figure 5 is a plan view of a section of the traveling carrier and transverse series of pairs of holders for the fruits and vegetables and constituting a holding unit adapted to selectively discharge the fruits or vegetables in succession according to size or grade;

Figure 6 is a section on the line 6—6 of Figure 5;

Figure 7 is a section on the line 7—7 of Figure 6;

Figure 8 is a view similar to Figure 6 but showing the members of sections forming a holder for the fruit or vegetables in open position for the discharge of the articles held;

Figure 9 is a view similar to Figures 6 and 8 but showing the members of sections forming a holder in closed positions as in approaching the points of sorting and grading.

In carrying out my invention in practice in accordance with the illustrated example, a suitable machine frame 10 is provided mounting the various operative parts. On the frame 10 is supported drive sprockets 11 at one end and idler sprockets 12 at the other end of the machine, the drive sprockets being mounted on the drive shaft 111 driven from any convenient source of power (not shown). Endless chains 13 run over the sprockets 11 and 12 and have support on angle tracks 14 in the forward and return runs of the chains.

The chains carry an endless series of carrying and discharge holders for the individual fruits or vegetables. Individual holder sections 15 are arranged in pairs to form a holding unit, and these individual sectional holders are rigid with each other by reason of being formed on transverse bars 16. The individual holder sections 15 form at each bar a 4-point contact by reason of the oblique surfaces 17 to provide for proper holding of the fruits or vegetables irrespective of the irregularity of shape of the same. The holder bars 16 are each pivoted at its opposite ends by studs 18 on certain links of the chains 13 (see Figures 6 and 9).

To provide for the rocking of the bars 16 and the holder sections 15 in unison, I mount toothed sectors 19 on the central holder sections 15, the toothed sectors 19 on the bars 16 meshing with each other so that the holder sections 15 are constrained to rock in complete unison on their pivots 18.

Provision is made, as hereinafter described, for selectively discharging the fruits or vegetables according to size and for grading the same and directing them to suitable receptacles. In the illustrated form the means for the purpose includes inclined boards 20 at one side and an inclined chute 21 at the other side, the boards 20 leading in the present example to individual structures 22 for receiving the various sizes of fruits or vegetables at that side, said structures being adapted to accommodate fruit boxes (not shown). The supporting means for the fruit boxes will be hereinafter described. The chutes 21 are adapted to direct in the present example the fruits or vegetables into barrels 23, and very obviously sacks may be substituted for the barrels indicated.

On the central holder sections 15, that is to say, at the medial line of the machine, in practice I provide on the holder sections 15 or otherwise rigid with each bar 16, a finger 24 adapted to move along tracks 25 adjacent to each incline 20 and chute 21. As will be seen from Figure 1 the track sections 25 pertaining to the successive boards 20 and chutes 21, and therefore pertaining to the receiving structures 22 and barrels 23, are set at lower levels progressively. Thus it will be be seen that the left hand track 25 (Fig. 1) is slightly higher than the next succeeding track 25, the track sections lowering progressively. The fingers 24 will be permitted to drop as successively lower track sections 25 are engaged by the said fingers 24, and by reason of the successively lower track sections the fingers 24 will drop more or less in maintaining contact with the track sections. This permits the bars 16 and holder sections 15 thereon to be turned on their pivots 18. Hence the holder sections 15 of a pair will open wider and wider as the traveling chains 13 move from the receiving end of the fruit and vegetable carrier means to the opposite end. This is illustrated in Figure 1 where an incline 125 is indicated so close to the path of travel of the bars 16 and holder sections 15 that said holder sections are maintained closed and no fruit can drop therefrom. When the first track 25 is encountered by the fingers 24 the holder sections 15 open sufficiently for the smallest fruit to drop to the adjacent board 20 and adjacent chute 21, as indicated clearly at $a$ in Figure 1. The next track section 25 being slightly lower, slightly larger fruits or vegetables, indicated at $b$, will be permitted to escape from the holder sections 15. Further movement of the traveling chains away from the receiving end will by reason of the lower level of the next succeeding track section 25 select the next larger size of fruits or vegetables, indicated conventionally at $c$, until the largest size of fruits or vegetables will be permitted to escape at the final track section 25, as indicated at $d$. Thus the various sizes of fruits or vegetables are selectively caused to be discharged by the variations in the height of the track sections 25 and are thus automatically sorted and graded.
In order to provide for varying the levels of the respective track sections 25, I provide adjusting means, shown more particularly in Figure 3 as vertical track lifting elements 26 slidable in guide bearings 126 on the fixed part of the machine. Separate lifting bars 26 are provided for each track section 25, each lift bar 26 being connected at one end to a lever 27 fulcrumed between its ends as at 28, the opposite end of each lever 27 being connected by a hanger link 29 to a hand lever 30 having a latch adapted to be engaged with a toothed sector 32 to hold the track sections 25 at a given elevation.

The fruits and vegetables fall from the respective inclines 20 onto cushioning elements 33 slightly below the level of the lower ends of the inclines 20 and approximately horizontal therewith. A cushioning element 33 is provided in each receiving structure 22.
In each structure also is a platform 34 to which the fruits or vegetables may fall directly, or which may receive a box (not shown).

The platform 34 is sustained at the upper end by toggles 35, the lowermost toggle levers 36 of which are connected by a spring 37. Toggle levers 36 are fulcrumed to the framework of the machine as at 136. An oblique equalizing bar 38 is pivotally connected at its ends with the respective toggles 35. As the fruits or vegetables falling on the platform 34 increase, the increased weight causes said platform to lower, the spring 37 yielding and the toggles 36 accommodating themselves to the lowering movement of said platform.

The purpose of the described assemblage in each structure 22 is to maintain the level of the received fruits or vegetables adjacent to the cushioning element 33 to prevent bruising of the fruits or vegetables.

From each chute 21 the fruit is directed to the barrel 23 or equivalent receptacle. To cushion the fruit falling into each barrel 23 I provide cushioning means so positioned as to be disposed within each barrel. In the illustrated form padded cushioning elements 39 are hung off center on a hanger 40 suspended from a lever 41 which in the illustrated form is fulcrumed a slight distance from one end 41 on a fixed bracket 43.

A frame 45 having a platform 46 for the barrel 23 is disposed vertically and moves in suitable fixed guides 47, said frame 45 being connected by a link 44 with the short arm of lever 41. The arrangement is such that weight due to increased quantity of fruits or vegetables received in the barrel 23 will cause the platform 46 and the frame 45 to descend at the same time the connection by the link 44 with element 41 and hanger 40 will cause the padded cushioning element 39 to rise in the barrel so that it always remains approximately the same distance above the top of the fruits or vegetables received by the barrel 23.

The side bars of the frame 45 carry fixed arms 48 thereon which are adapted to bear against the top of springs 50 coiled about the side members of frame 45. Thus the increased weight of the fruits or vegetables accumulating in the barrel 23 causes the frame 45 to descend and will result in causing the arms 48 to compress the springs 50. Nuts 51 on vertical rods 49 serve to adjust the tension of the springs 50.

I provide buffer means to prevent injury to the fruits or vegetables as they pass over the cushioning elements 33. The said buffer means consists of revolving brushes 52 disposed over each element 33 on a longitudinal shaft 53 driven in any suitable manner, there being shown a worm wheel 54 on said shaft driven by a worm 55 on the drive shaft 111.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. In a machine for sizing and grading fruits and vegetables, a series of rockable bars arranged in pairs, the bars having members forming with the bars sectional holders for individual fruits and vegetables, means to cause travel of the holders, and means to simultaneously and progressively open the sections of the holders to afford an increasing size of the opening between the sections for the discharge of fruits and vegetables.

2. In a machine for sizing and grading fruits and vegetables, a series of rockable bars, means to cause travel of said bars, holders on the bars to jointly form individual holders for fruits and vegetables, fingers on the bars and track sections arranged at different levels on which said track sections said fingers travel, the varying heights of the track sections permitting the fingers to drop to an increasing extent to progressively increase the discharge openings afforded by the holders for permitting escape in succession for the different sizes of fruits and vegetables.

3. In a machine for sizing and grading fruits and vegetables, a series of rockable bars, means to cause travel of said bars, holders on the bars to jointly form individual holders for fruits and vegetables, fingers on the bars and track sections arranged at different levels on which said track sections said fingers travel, the varying heights of the track sections permitting the fingers to drop to an increasing extent to progressively increase the discharge openings afforded by the holders for permitting escape in succession for the different sizes of fruits and vegetables; together with means for adjusting the track sections to vary the level thereof.

4. In a machine for sizing and grading fruits and vegetables, a series of rockable bars arranged in pairs, the bars of a pair forming holders for individual fruits and vegetables, means to cause travel of the series of bars, and means to progressively open the bars of a pair to afford an increasing size of the opening therebetween for the discharge of fruits and vegetables; together with toothed sectors on the bars of a pair and intermeshing to constrain the one bar of a pair to partake of the same rocking movement as the other bar of the pair.

5. In a machine for sizing and grading fruits and vegetables, a frame, an endless carrier, a plurality of holders formed of sections, each pivoted to the carrier, cooperating means on the holders and frame for rocking one section of the holder, and means carried by the sections to cause them to rock in unison.

6. In a machine for sizing and grading fruits and vegetables, a frame, an endless carrier, a plurality of holders formed of sections, each pivoted to the carrier, a finger mounted on one of the sections of each holder, a plurality of track sections arranged on the frame at different levels and on which the finger travels, and means on the sections of the holders to cause them to move in unison.

7. In a machine for sizing and grading fruits and vegetables, a frame, an endless carrier, a plurality of holders formed of sections, each pivoted to the carrier, a finger mounted on one section of each holder, track sections arranged on the frame at different levels and upon which the finger travels, means for adjusting the track sections, and toothed sectors on the sections of the holders and meshing with each other.

Signed at Toppenish in the county of Yakima and State of Washington this 25th day of April A. D. Nineteen Hundred and Twenty-eight (1928).

ANDREW O. MOE.